(12) United States Patent
Larocque

(10) Patent No.: US 6,311,648 B1
(45) Date of Patent: Nov. 6, 2001

(54) HYDROGEN-OXYGEN/HYDROCARBON FUEL SYSTEM FOR INTERNAL COMBUSTION ENGINE

(76) Inventor: Jean-Louis Larocque, 195, rue des Frênes, Pointe-aux-Trembles, Québec (CA), H1B 1X7

( * ) Notice: Subject to any disclaimer, the term of this patent is extended or adjusted under 35 U.S.C. 154(b) by 0 days.

(21) Appl. No.: 09/507,734

(22) Filed: Feb. 22, 2000

(51) Int. Cl.⁷ ....................................................... C25B 1/02
(52) U.S. Cl. ............................................................... 123/3
(58) Field of Search .............................. 123/3, DIG. 12; 204/278

(56) References Cited

U.S. PATENT DOCUMENTS

| | | |
|---|---|---|
| 3,906,913 | 9/1975 | Rupe. |
| 4,181,100 | 1/1980 | Yamane et al.. |
| 4,253,428 | 3/1981 | Bilings et al.. |
| 4,271,793 * | 6/1981 | Valdespino ................................. 123/3 |
| 4,362,137 | 12/1982 | O'Hare. |
| 4,520,763 | 6/1985 | Lynch et al.. |
| 5,399,251 * | 3/1995 | Nakamats ................................. 123/3 |
| 5,546,902 | 8/1996 | Paluch et al.. |

OTHER PUBLICATIONS

The Economist (Dec., 1999) Space–age soot.

* cited by examiner

Primary Examiner—Tony M. Argenbright
Assistant Examiner—Hyder Ali

(57) ABSTRACT

A device for injection of molecular hydrogen and oxygen into the combustion chambers of a gasoline engine, along with the fuel-air mixture, to improve fuel efficiency and to reduce and in some cases eliminate engine emissions. The hydrogen-oxygen/hydrocarbon fuel system includes: a water source; an electrolytic chamber, an anode and a cathode mounted into the chamber in closely spaced fashion from one another; two fluid lines to fluidingly connect the water source and the fuel tank to the chamber; and an electrical power source, for electrically charging the anode and cathode.

17 Claims, 6 Drawing Sheets

HYDROGEN-OXYGEN/HYDROCARBON FUEL SYSTEM FOR INTERNAL COMBUSTION ENGINE

FIELD OF THE INVENTION

This invention relates to device for enhancing fuel combustion in an internal combustion engine, while improving the engine efficiency and eliminating at least one toxic by-product from its combustion.

BACKGROUND OF THE INVENTION

Major industrial countries in the world now have regulations relating to the level of exhaust emissions from automobiles, which are imposing progressively reduced permitted levels of internal combustion engine emissions. This in turn increases the demand for greater control of the combustion process of the internal combustion engines.

U.S. Pat. No. 3,906,913 issued in September 1975 to the CALIFORNIA INSTITUTE OF TECHNOLOGY, discloses a device for mixing hydrogen with hydrocarbon fuel and air for use in the internal combustion engine of an automobile. However, such device requires a substantial "on-board" hydrogen generating capacity, to meet the large consumption of hydrogen, which consumes energy, occupies valuable space and adds weight to the vehicle.

U.S. Pat. No. 5,546,902 issued on Aug. 20, 1996 to the Australian company ORBITAL ENGINE COMPANY (AUSTRALIA) Pty, Limited, discloses a fuel/gas delivery system for use with an internal combustion engine, in which hydrogen is mixed with hydrocarbon fuel for introduction into the combustion chamber of the engine. In this patent, the hydrogen is delivered to the combustion chamber only when the engine is operating in a selected low to medium load range. Moreover, the injection of the hydrogen is enabled directly into the combustion chamber, which occurs independently and later than the fuel delivery; therefore, only relatively small amounts of hydrogen are required to achieve the desired improvement in the ignitability of the fuel/air mixture. Substantial improvement in the combustion process is claimed to be achieved with as little as 2% hydrogen injection in relation to the fuel charge. The low hydrogen usage thus enabled enhances the possibility of providing an economical means of producing sufficient quantities of hydrogen on-board an automobile. A claimed advantage is that the hydrocarbon (HC) and the toxic carbon monoxide (CO) contents of the exhaust gas are reduced, but not eliminated.

OBJECTS OF THE INVENTION

An important object of the invention is to improve upon the fuel/gas delivery system described in U.S. Pat. No. 5,546,902, supra, by completely eliminating the toxic CO by-products from automobile internal combustion engines.

A general object of the invention is to enhance the combustion process and increase the efficiency of internal combustion engines by reducing the level of exhaust emissions from the automobile internal combustion engine.

An object of the invention is to decrease fuel consumption of automobiles with internal combustion engines.

A further object of the invention is to increase the travelling range of the automobile for a given volume of fuel.

SUMMARY OF THE INVENTION

In accordance with the objects of the invention, the invention relates generally speaking to a hydrogen-oxygen/hydrocarbon fuel system for enhancing the efficiency of an internal combustion engine by supplying a mixture of hydrogen and oxygen gases and liquid hydrocarbon fuel to the fuel line of this internal combustion engine, said fuel system comprising:

a) a water source;
b) an electrolytic member defining a main liquid chamber having a gas bell therein, said water chamber and gas bell being in liquid communication with one another under communicating vessels principle;
c) an anode bar and a cathode bar mounted into said gas bell in closely spaced fashion from one another; a first fluid line, fluidingly interconnecting said water source to said main liquid chamber;
d) a second fluid line, coupled to said gas bell for fluidingly interconnecting said gas bell to the fuel line; and
e) an electrical power source, for electrically charging said anode bar and said cathode bar, wherein molecular hydrogen and oxygen generated from electrolytic separation of the body of water inside said gas bell escapes in gaseous state from said gas bell through said second fluid line, for displacement toward and into the fuel line and for admixing with the hydrocarbon fuel.

More specifically, the invention as disclosed consists of a hydrogen-oxygen/hydrocarbon fuel system for enhancing the efficiency of the internal combustion engine of an automobile by supplying a mixture of hydrogen and oxygen gases and liquid hydrocarbon fuel to the fuel line of this internal combustion engine, said fuel system comprising:

a) a water source;
b) an electrolytic chamber having an outer housing and an inner housing, said outer housing having a sealed flooring and said inner housing having a bottom mouth, a hanging member fixedly interconnecting said inner and outer housings and supporting said inner housing spacedly over said outer housing flooring wherein a spacing gap is defined between said inner housing bottom mouth and said outer housing flooring, and an anode and a cathode mounted into said inner housing in closely spaced fashion from one another;
c) a first fluid line, fluidingly interconnecting said water source to said outer housing;
d) a second fluid line, coupled to said inner housing for fluidingly interconnecting said inner housing to the fuel tank;
e) an electrical power source, for electrically charging said anode and cathode, wherein molecular hydrogen and oxygen generated from electrolytic separation of the body of water inside said inner housing escapes from said electrolytic chamber through said second fluid line, for displacement toward and into the fuel tank of the automobile and for admixing with the hydrocarbon fuel in the fuel tank.

Preferably, said water source consists of salt water, preferably of a concentration of about 160 grams per liter of water.

The water source should be positioned higher relative to said electrolytic chamber, whereby said water is gravity fed to said electrolytic chamber.

It is envisioned that said second fluid line communicates with said inner housing via an access port, and further including a buoyancy member, installed into said inner housing in register with said access port for sealing the latter upon said inner housing becoming completely filled to capacity with water.

Preferably, a water filter is mounted to said second fluid line for preventing accidental liquid water seeping from said inner housing into the fuel tank.

Said anode and cathode may each consist of a flat metallic panel made from a material selected from the group comprising brass and graphite, stainless steel, silver and copper; but graphite for anode and brass for cathode are preferred. Said anode and cathode panels preferably extend parallel to one another and are spaced from one another by about 2 to 4 millimeters (mm), but preferably 3 mm.

An electrically insulating sheath member may be fitted to an intermediate section of said second fluid line for preventing accidental transmission of electric current from said electrolytic chamber to the fuel tank.

Preferably, there is further included a fuse relay system, intermediate said electrical power source and said anode and cathode panels, said fuse relay system preventing electric current from said electrical power source to reach said anode and cathode panels when the internal combustion engine is not running.

The present invention also relates to the combination of an automobile with the above-noted hydrogen-oxygen/hydrocarbon fuel system fitted inside the automobile.

DETAILED DESCRIPTION OF THE PREFERRED EMBODIMENT OF THE INVENTION

Figure 1:
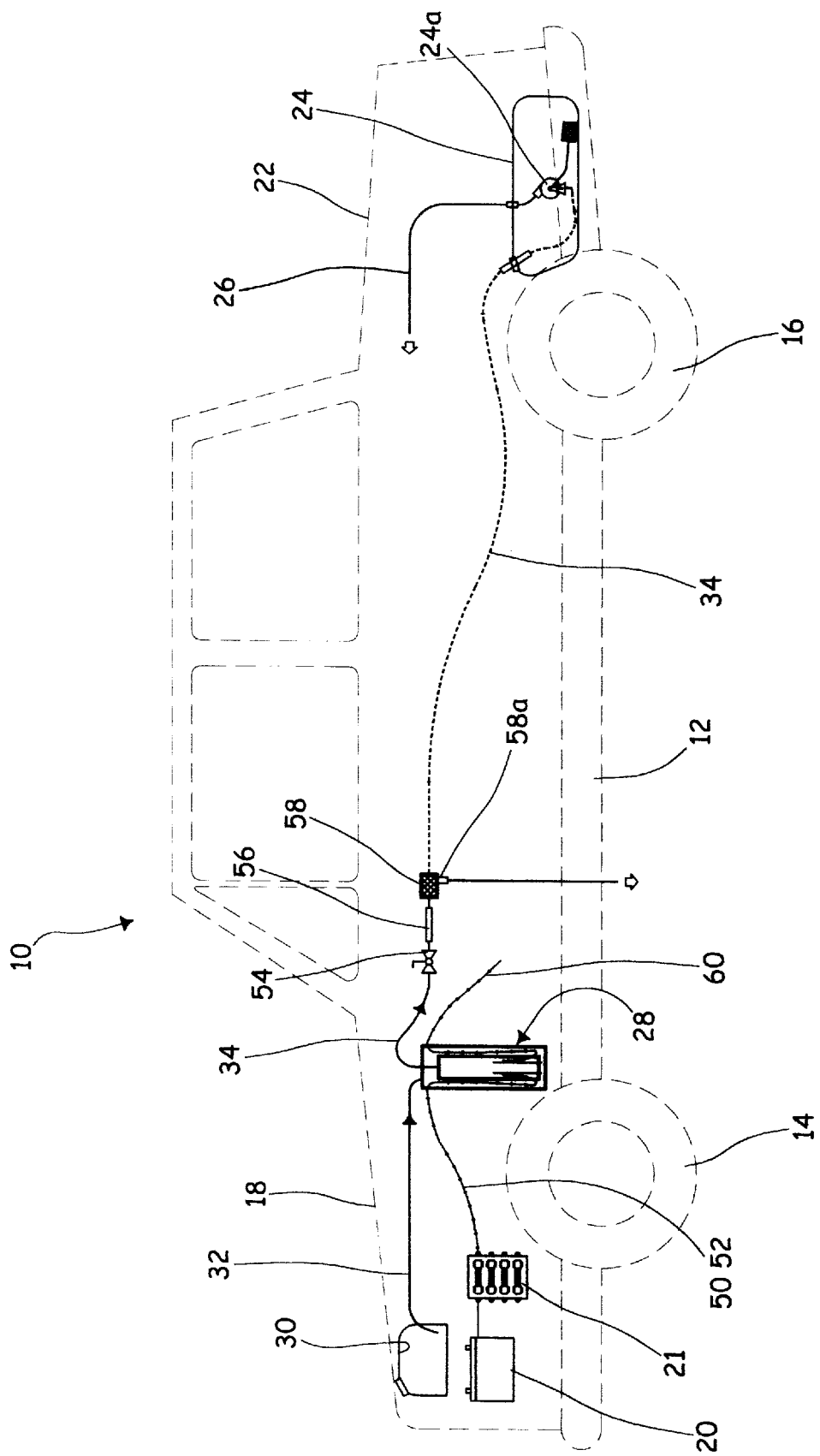
FIG. 1 is a side elevational view of an automobile, schematically illustrated in phantom lines, and fitted with the hydrogen-oxygen injecting device of the invention shown in full lines.
Figure 2:
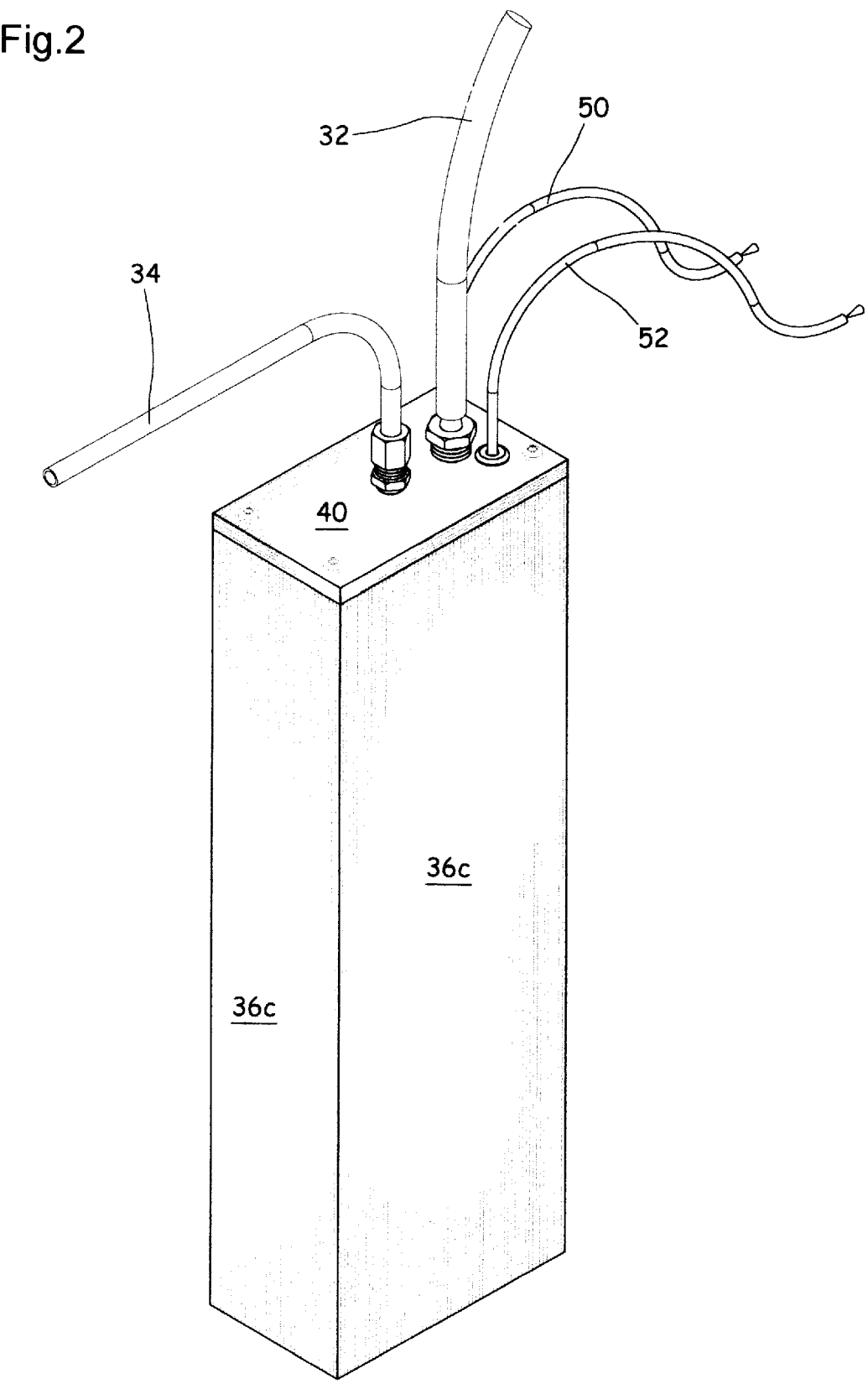
FIG. 2 is an enlarged perspective view of the electrolytic chamber used as a component of the hydrogen-oxygen injecting device.
Figure 3:
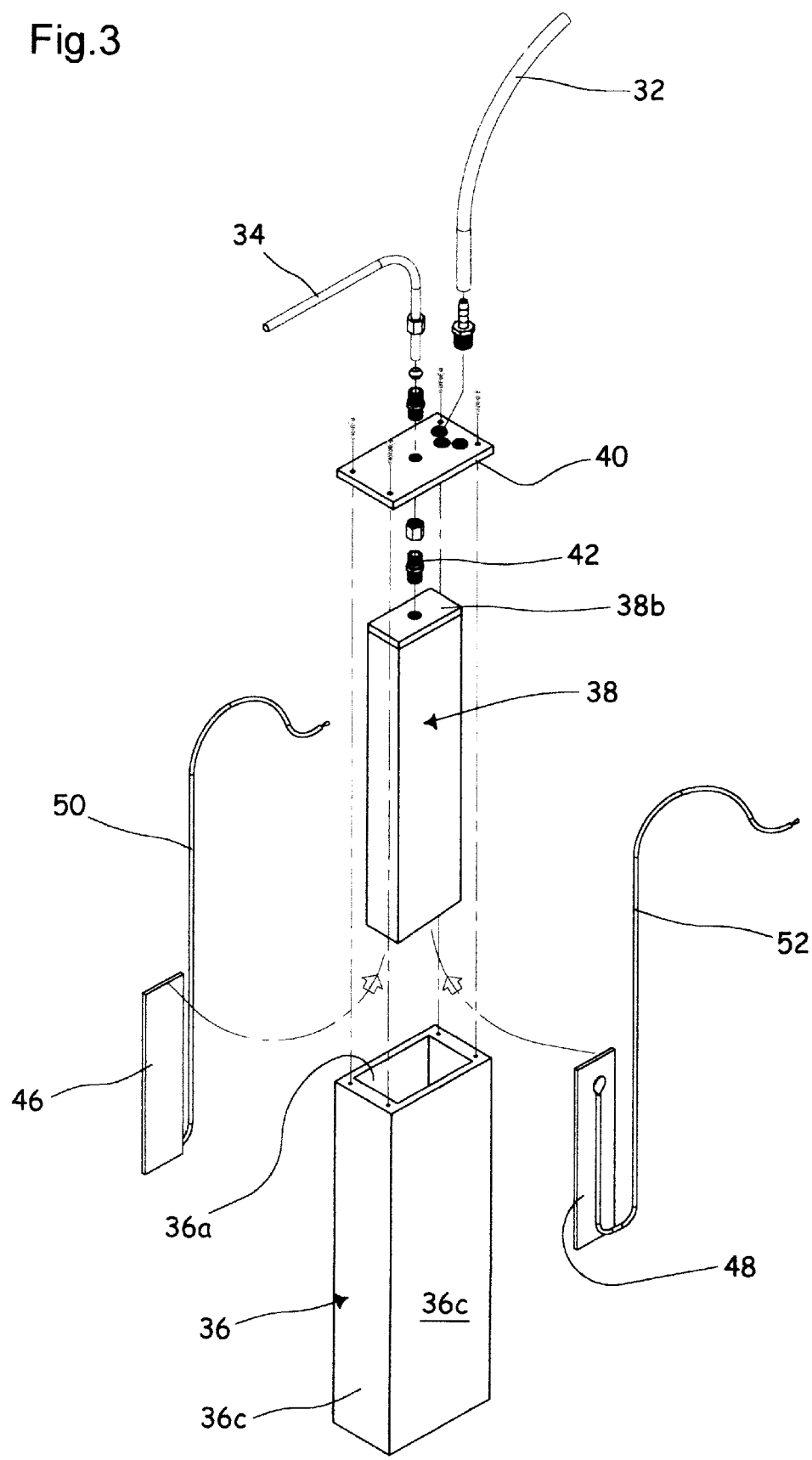
FIG. 3 is an exploded view of the hydrogen-oxygen injecting device electrolytic chamber.

The automobile illustrated in FIG. 1 as 10 conventionally includes a chassis 12 carried over ground by a first pair of front axle wheels 14 and by a second pair of rear axle wheels 16. Under the front hood 18 is found the motor engine, not shown, and under the rear trunk 22 is found the fuel tank 24. The fuel tank 24 is fluidingly connected to the motor engine (not illustrated) via a flexible fuel line 26.

Accordingly with the invention, there is provided under the hood 18 an on-board electrolytic chamber 28, anchored to the automobile chassis. A high-salt content water tank 30 is further provided under the hood, preferably anchored to and adjacent of the conventional windshield wiper fluid tank (not illustrated). Salt concentration in the water is preferably of about 160 grams per liter of water. The volumic content of water tank 30 is for example half a liter. The added salt is to increase conductivity of the solution and to prevent ice formation in sub-freezing conditions. A first flexible line 32 fluidingly interconnects the salt water tank 30 to the electrolytic chamber 28, for feeding salt water into the catalytic chamber. The diameter of line 32 may be for example about 6 millimeters (mm). Salt-water tank 30 should be positioned at a higher position relative to electrolytic chamber 28, for enabling automatic gravity feed of salt water into chamber 28. A second flexible line 34 fluidingly interconnects the electrolytic chamber 28, to the gaz pump intake spout 24a of fuel tank 24, for a purpose set forth hereinbelow.

The electrolytic chamber 28 illustrated in FIGS. 2–6 includes a first larger box-like housing 36, having a top mouth 36A, and a second smaller box-like housing 38 having a bottom mouth 38A and lodged inside the hollow of the larger housing 36. Outer housing 36 includes a bottom flooring 36B, and four side walls 36C in sealing engagement with one another and with the flooring 36B. Outer housing 36 is longer and diametrally larger than inner housing 38. A lid 40 releasably seals the top mouth 36A of outer housing, and is spacedly connected to the top end wall 38B of the inner housing 38 by a tubular connector 42, wherein the inner housing 38 hangs spacedly over the outer housing flooring 36B whereby a spacing gap 44 is defined between the bottom mouth 38A of inner housing 38 and the underlying flooring 36B of outer housing 36. Preferably, housings 36, 38 are made from plexiglass, which could be transparent plexiglass for enabling see-through inspection for maintenance. The size of chamber 28 may be for example about 8 centimeters (cm) wide, 4 cm deep, and 28 cm high.

Figure 4:
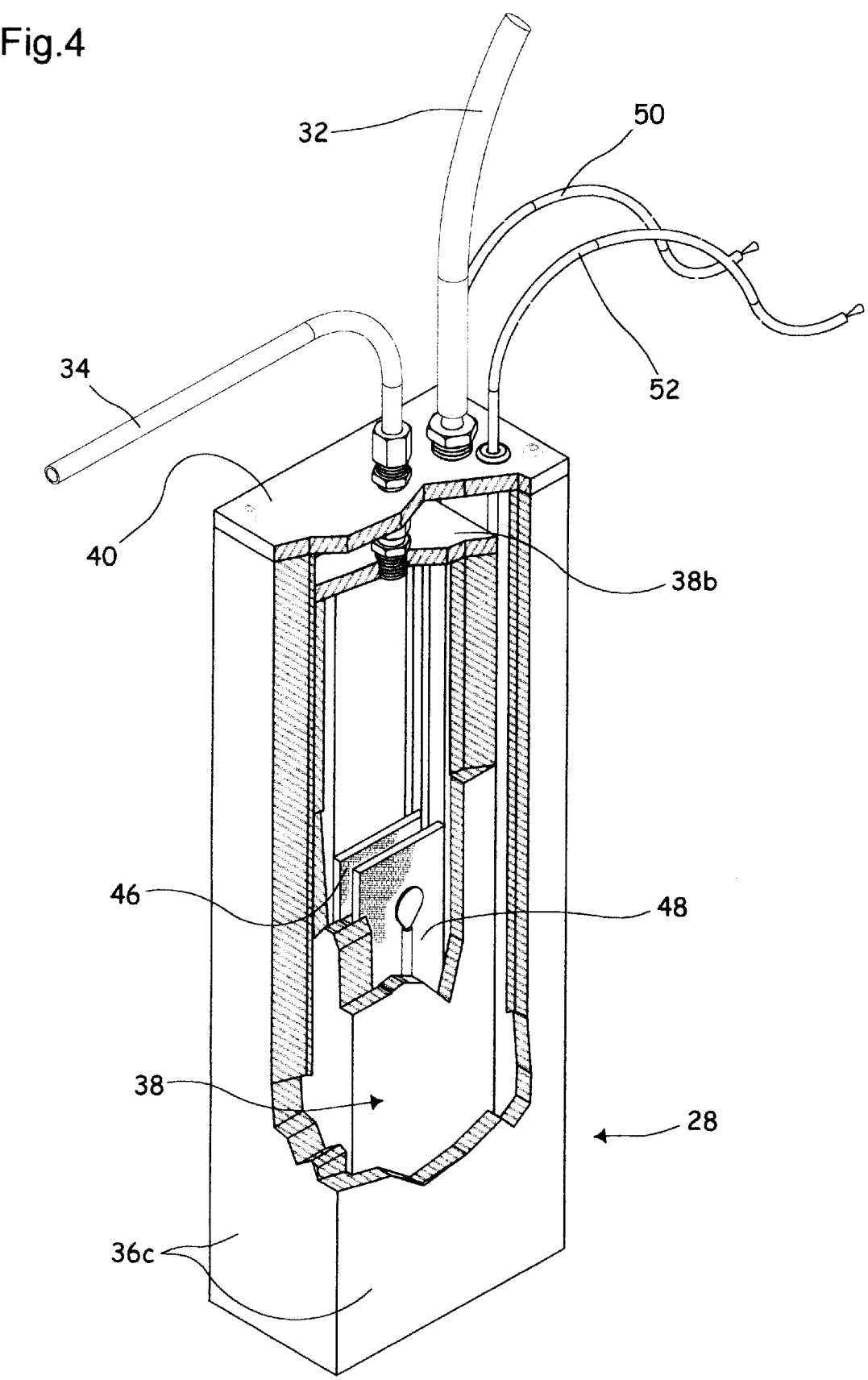
FIG. 4 is a view similar to FIG. 2, but partly broken for improved clarity of the view of the electrolytic chamber elements.
Figure 6:
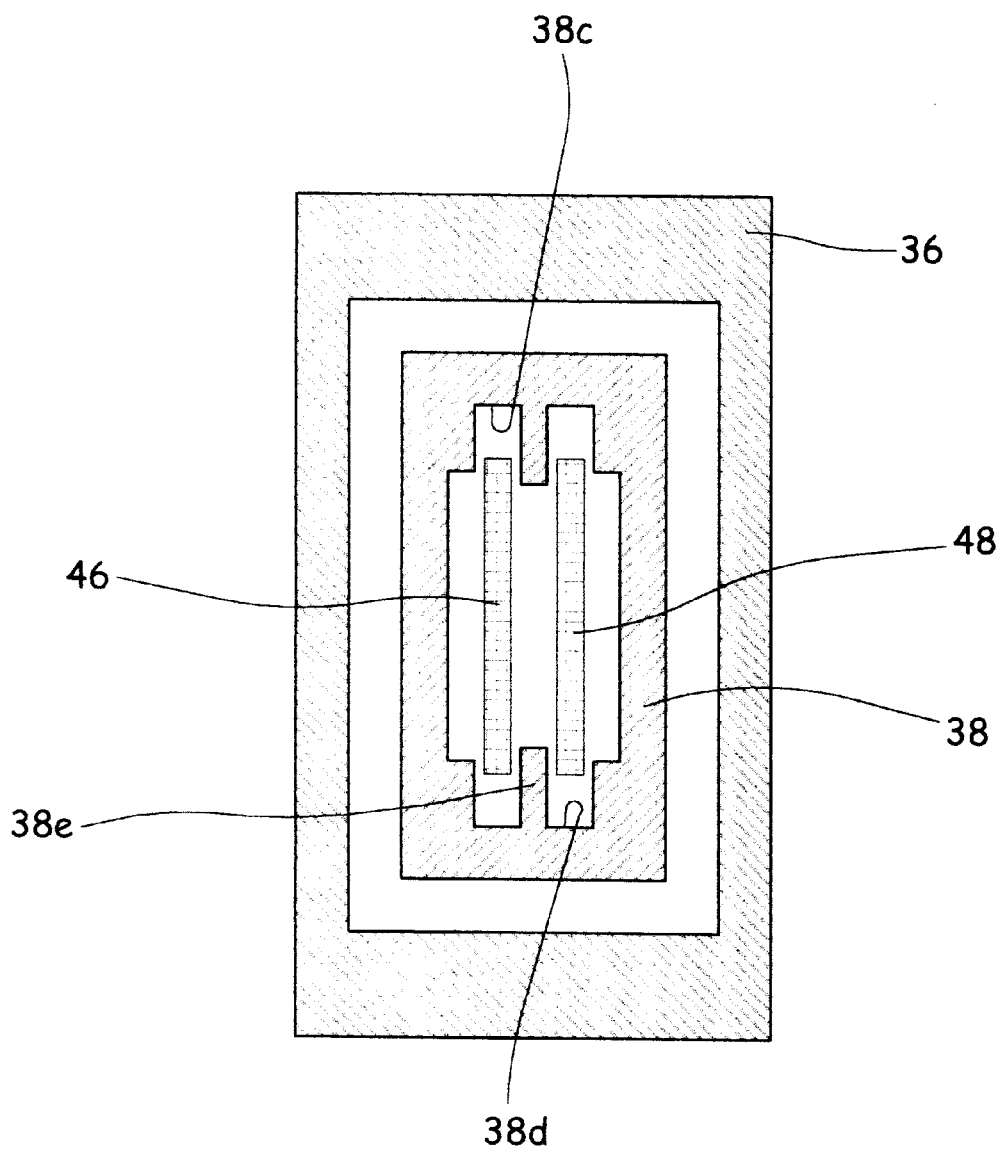
FIG. 6 is a cross-sectional view taken along line 6—6 of FIG. 5.

As best shown in FIGS. 4 and 6, inner housing 38 further includes a pair of lengthwise peripheral grooves 38C, 38D. A pair of first and second anode and cathode quadrangular flat panels 46, 48, are fitted edgewisely inside respective grooves 38C, 38D, within inner housing 38, in spaced parallel fashion relative to one another, and on opposite sides of the peripheral inner rail 38E formed between the two grooves 38C and 38D. Hence, rail 38E constitutes an upright spacer member for maintaining panels 46, 48, positively spaced from one another. Preferably, the thickness of inner rail 38E, and thus the distance between the two anode and cathode panels 46, 48, range sbetween approximately 2 and 4 millimeters (mm), and preferably about 3 mm. Panels 46, 48, have a length for example half that of inner housing 38, and a width slightly smaller than the width of the inner hollow of inner housing 38. Each panel 46, 48, is electrically coupled to the battery 20 of automobile 10, via insulated electrical lines 50, 52, respectively. A fuse relay system 21 is mounted to lines 50, 52, intermediate battery 20 and the electrolytic chamber 28, to prevent the anode and cathode bars from receiving electric current when the motor engine is not running.

The preferred material for anode 46 is graphite and cathode 48 is brass. However, other suitable materials are not excluded from the scope of the present invention, including:

a) stainless steel—but durability is short;

b) silver—however their durability is then shorter;

c) copper.

Figure 5:
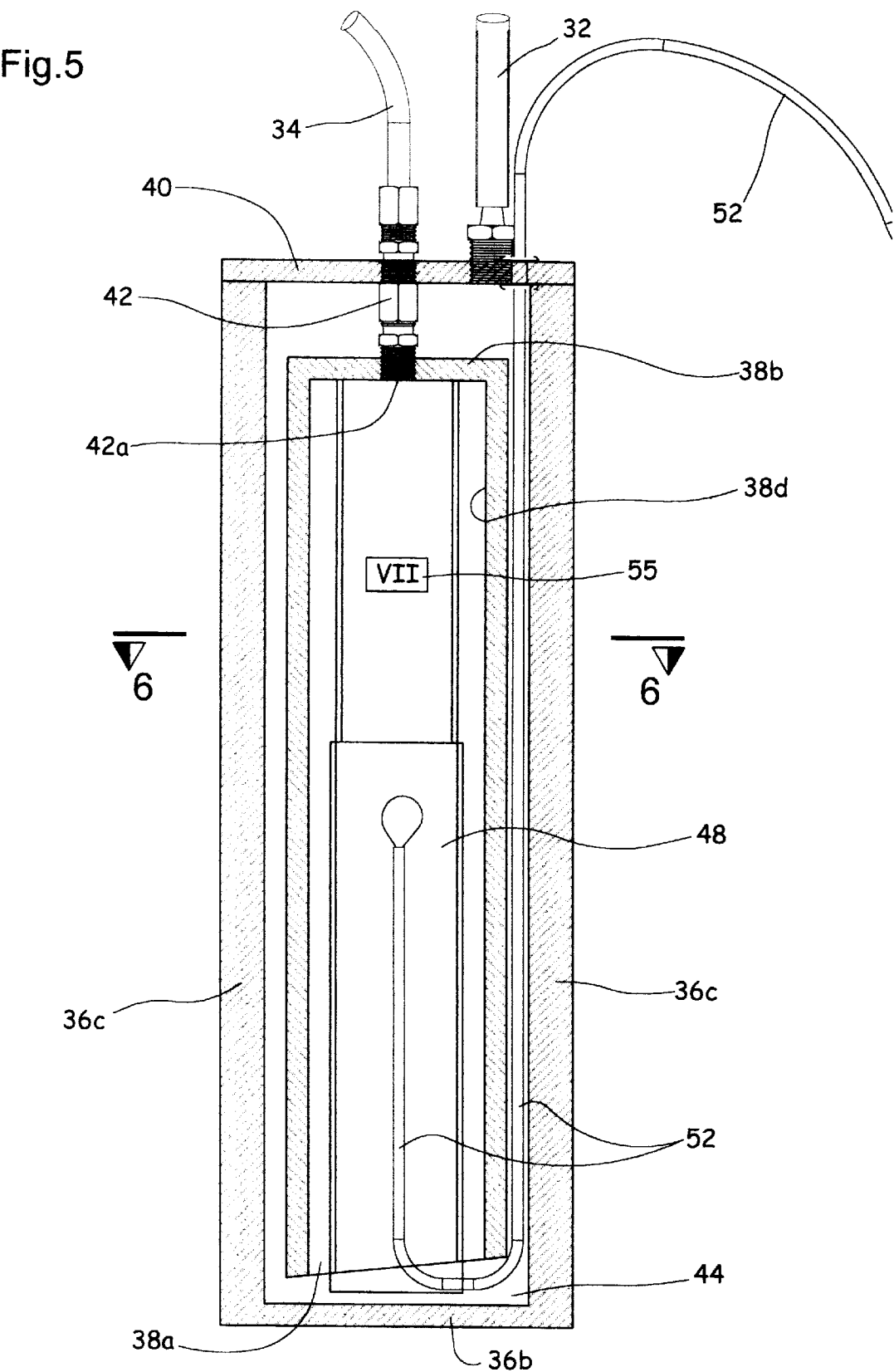
FIG. 5 is a vertical sectional view of the electrolytic chamber, at an enlarged scale relative to that of FIG. 2.

As best shown in FIG. 5 of the drawings, electric lines 50, 52, extend through inner housing bottom mouth 38A, across bottom spacing gap 44, upwardly through the hollow of outer housing 36 lengthwisely outwardly of inner housing 38, and sealingly through top lid 40. Most preferably, electric lines 50, 52, should be connected to a fuse box 20 before connection to the car electricity generating battery (not shown), to prevent electric current to pass therethrough except when the motor engine is running. In other words, no voltage differential should be applied on the electrical lines, if the ignition key is turned to its position where headlamps and radio can be powered without the motor engine running, as is known to motorists. This is enabled by providing a shut-off valve 54 on gazeous material line 34, with valve 54 opening only when motor engine 20 is running.

Preferably, there is further added to line 34 downstream of shut-off valve 54, an insulating elastomeric sheath 56, to prevent accidental electrical transmission from the car battery to the rear fuel tank 24. Also, a liquid water and water vapour filter 58 should preferably be added downstream of insulating sheath 56, to evacuate to the ground by outlet port 58a liquid water or water vapour that may have accidentally escaped with molecular hydrogen and oxygen, so that no water contaminant be present in the rear gas tank 24. Electrolytic chamber 28 should also be grounded, e.g. with ground line 60 illustrated in FIG. 1.

Preferably, fluid line 32 is made from flexible transparent plastic material, for facilitating maintenance; however, gaseous material line 34 may be made from copper for increased durability.

In operation, salt water is gravity fed from upper water tank 30 to lower chamber 28, to fill the latter. Electric current is applied to the anode and cathode 46, 48, by powering the motor engine. Molecular hydrogen and oxygen are produced from electrolysis of liquid salty water, which is released upwardly through outlet port 42A and hollow spacer conduit 42 from inner housing 38, in gaseous state. Gaseous molecular hydrogen and oxygen escape upwardly from the chamber 38, through outlet port 42A, hollow spacer 42, and flexible lines 50, 52, under siphon forces generated by the gaseous bubbles generated by electrolysis. The gaseous molecular hydrogen and oxygen reach the rear gas tank 24, where they become admixed with the liquid hydrocarbon fuel, before the hydrogen-oxygen/hydrocarbon fuel solution return to the motor engine via the intake spout 24A and the fuel line 26.

It has been found that salt water consumption of about 6 ounces per 1000 km of distance travelled by the automobile, was achieved.

Preferably, a buoyant member such as styrofoam plug 55 is provided inside the hollow of inner housing 38. Should salt water level inside housing 38 reach top end wall 38B, plug 55 would engage the intake port 42A of exit line 34 and seal the latter, to prevent accidental liquid water solution leakage into the hydrogen-oxygen gas exit line 34, which leads to the rear fuel tank 24. Excess liquid water may then automatically backflow under siphoning forces generated by water electrolysis, into the salt water tank 30 via liquid water line 32.

An important safety feature of the present invention is that molecular hydrogen production occurs with concurrent consumption thereof, so that there is no need for storage thereof.

Therefore, no pressurized hydrogen tank is required, and this is preferable because of difficulties associated with refilling, handling and safety therewith. Indeed, hydrogen gas in pressurized tanks is highly explosive, and therefore, dangerous for the consumer.

In the present invention, there is injecting under pressure of a controlled quantity of gaseous hydrogen and oxygen into the combustion chambers of the internal combustion engine, at the same time as liquid hydrocarbon fuel is injected. By injecting molecular hydrogen, fuel combustion is enhanced so that the quantity of energy generated is significantly greater. In addition, the presence of molecular hydrogen eliminates CO emissions. Indeed, fuel combustion usually generates toxic by-products harmful to the environment, including carbon monoxide (CO) which is lethal to humans if repeatedly inhaled. However, the simultaneous combustion of molecular hydrogen in the process accordingly with the present invention, unexpectedly eliminates in totality CO by-products, while considerably increasing the production of non-toxic carbon dioxide ($CO_2$).

Therefore, the solution retained in effects advantageously transforms all CO byproducts into non-toxic $CO_2$.

Preliminary testing were recently carried out on a standard American make automobile fitted with the present electrolytic chamber, and a source of salt water having sea salt at a concentration of about 160 grams per liter of water. These tests have yielded the following results:

| Engine RPM | CO | HC | CO2 | O2 |
| --- | --- | --- | --- | --- |
| 761 | 0% | 20 Ppm | 15.19% | 0.27% |
| 1913 | 0% | 9 Ppm | 15.32% | 0.14% |

These results show that at a low RPM of 761 as well as a medium RPM rating of 1913, the CO count remained constantly at zero in the combustion gazes escaping from the motor engine. It is obviously of public interest to eliminate lethal gases generated as by-products of internal combustion engine operations.

In addition, road tests have shown that the present device considerably improves fuel combustion, which also has the two following outcomes:

1) the number of miles travelled with the same quantity of fuel, can be increased by up to about 30%; and
   the power output generated by the motor engine is also increased.

I claim:

1. A hydrogen-oxygen/hydrocarbon fuel system for enhancing the efficiency of the internal combustion engine of an automobile by supplying a mixture of hydrogen and oxygen gases and liquid hydrocarbon fuel to the fuel line of this internal combustion engine, said fuel system comprising:

a) water source;

b) an electrolytic chamber having an outer housing and an inner housing, said outer housing having a scaled flooring and said inner housing having a bottom mouth, a hanging member fixedly interconnecting said inner and outer housings and supporting said inner housing spacedly over said outer housing flooring wherein a spacing gap is defined between said inner housing bottom mouth and said outer housing flooring, and an anode and a cathode mounted into said inner housing in closely spaced fashion from one another;

c) a first fluid line, fluidingly interconnecting said water source to said outer housing;

d) a second fluid line, coupled to said inner housing for fluidingly interconnecting said inner housing to the fuel tank;

e) an electrical power source, for electrically charging said anode and cathode, wherein molecular hydrogen and oxygen generated from electrolytic separation of the body of water inside said inner housing escape from said electrolytic chamber through said second fluid line, for displacement toward and into the fuel tank of the automobile and for admixing with the hydrocarbon fuel in the fuel tank;

wherein said water source consists of salt water.

2. A fuel system as in claim 1,
    wherein said second fluid line communicates with said inner housing via an access port, and further including a buoyancy member, installed into said inner housing in register with said access port for sealing the latter upon said inner housing becoming completely filled to capacity with water.

3. A fuel system as in claim 1,
wherein said water source is positioned higher relative to said electrolytic chamber, whereby said water is gravity fed to said electrolytic chamber.

4. A fuel system as in claim 1,
further including a water filter, mounted to said second fluid line for preventing accidental liquid water seeping from said inner housing into the fuel tank.

5. A fuel system as in claim 1,
wherein said anode and cathode each consists of a flat metallic panel made from a material selected from the group consisting of stainless steel, silver, copper, brass and graphite.

6. A fuel system as in claim 5,
wherein the material of said anode is graphite and for cathode is brass.

7. A fuel system as in claim 5,
wherein said anode and cathode panels extend parallel to one another and are spaced from one another by about 2 to 4 millimeters.

8. A fuel system as in claim 7,
wherein said anode and cathode panels are spaced from one another by about 3 millimeters.

9. A fuel system as in claim 8,
wherein said water source consists of salt water of a concentration of about 160 grams per liter of water, and said salt water source is positioned higher than said electrolytic chamber, whereby said salt water is gravity fed to said electrolytic chamber.

10. A fuel system as in claim 5,
further including an electrically insulating sheath member, fitted to an intermediate section of said second fluid line for preventing accidental transmission of electric current from said electrolytic chamber to the fuel tank.

11. A fuel system as in claim 5,
further including a fuse relay system, intermediate said electrical power source and said anode and cathode panels, said fuse relay system preventing electric current from said electrical power source to reach said anode and cathode panels when the internal combustion engine is not running.

12. A hydrogen-oxygen/hydrocarbon fuel system for enhancing the efficiency of the internal combustion engine of an automobile by supplying a mixture of hydrogen and oxygen gases and liquid hydrocarbon fuel to the fuel line of this internal combustion engine, said fuel system comprising:

a) water source;
b) an electrolytic chamber having an outer housing and an inner housing, said outer housing having a sealed flooring and said inner housing having a bottom mouth, a hanging member fixedly interconnecting said inner and outer housings and supporting said inner housing spacedly over said outer housing flooring wherein a spacing gap is defined between said inner housing bottom mouth and said outer housing flooring, and an anode and a cathode mounted into said inner housing in closely spaced fashion from one another;
c) a first fluid line, fluidingly interconnecting said water source to said outer housing;
d) a second fluid line, coupled to said inner housing for fluidingly interconnecting said inner housing to the fuel tank;
e) an electrical power source, for electrically charging said anode and cathode, wherein molecular hydrogen and oxygen generated from electrolytic separation of the body of water inside said inner housing escape from said electrolytic chamber through said second fluid line, for displacement toward and into the fuel tank of the automobile and for admixing with the hydrocarbon fuel in the fuel tank;
wherein said second fluid line communicates with said inner housing via an access port, and further including a buoyancy member, installed into said inner housing in register with said access port for sealing the latter upon said inner housing becoming completely filled to capacity with water.

13. A hydrogen-oxygen/hydrocarbon fuel system for enhancing the efficiency of an internal combustion engine by supplying a mixture of hydrogen and oxygen gases and liquid hydrocarbon fuel to the fuel line of this internal combustion engine, said fuel system comprising:

a) a water source;
b) an electrolytic member defining a main liquid chamber having a gas bell therein, said water chamber and gas bell being in liquid communication with one another under communicating vessels principle;
c) an anode bar and a cathode bar mounted into said gas bell in closely spaced fashion from one another;
a first fluid line, fluidingly interconnecting said water source to said main liquid chamber;
d) a second fluid line, coupled to said gas bell for fluidingly interconnecting said gas bell to the fuel line; and
e) an electrical power source, for electrically charging said anode bar and said cathode bar,
wherein molecular hydrogen and oxygen generated front electrolytic separation of the body of water inside said gas bell escape in gaseous state from said gas bell through said second fluid line, for displacement toward and into the fuel line and for admixing with the hydrocarbon fuel; wherein said water source consists of salt water.

14. A fuel system as in claim 13,
further including a water filter, mounted to said second fluid line for preventing accidental liquid water seeping from said gas bell.

15. A fuel system as in claim 13,
wherein said anode bar and cathode bar each consists of a flat metallic panel made from a material selected from the group consisting of stainless steel, silver, copper, brass and graphite.

16. A fuel system as in claim 13,
wherein said anode bar and cathode bar extend parallel to one another and are spaced from one another by about 2 to 4 millimeters.

17. A fuel system as in claim 13,
wherein said salt water source is at a concentration between about 100 and 200 grams of salt per liter of water, and said anode and cathode bars are made front graphite and brass.

* * * * *